United States Patent Office 2,760,384
Patented Aug. 28, 1956

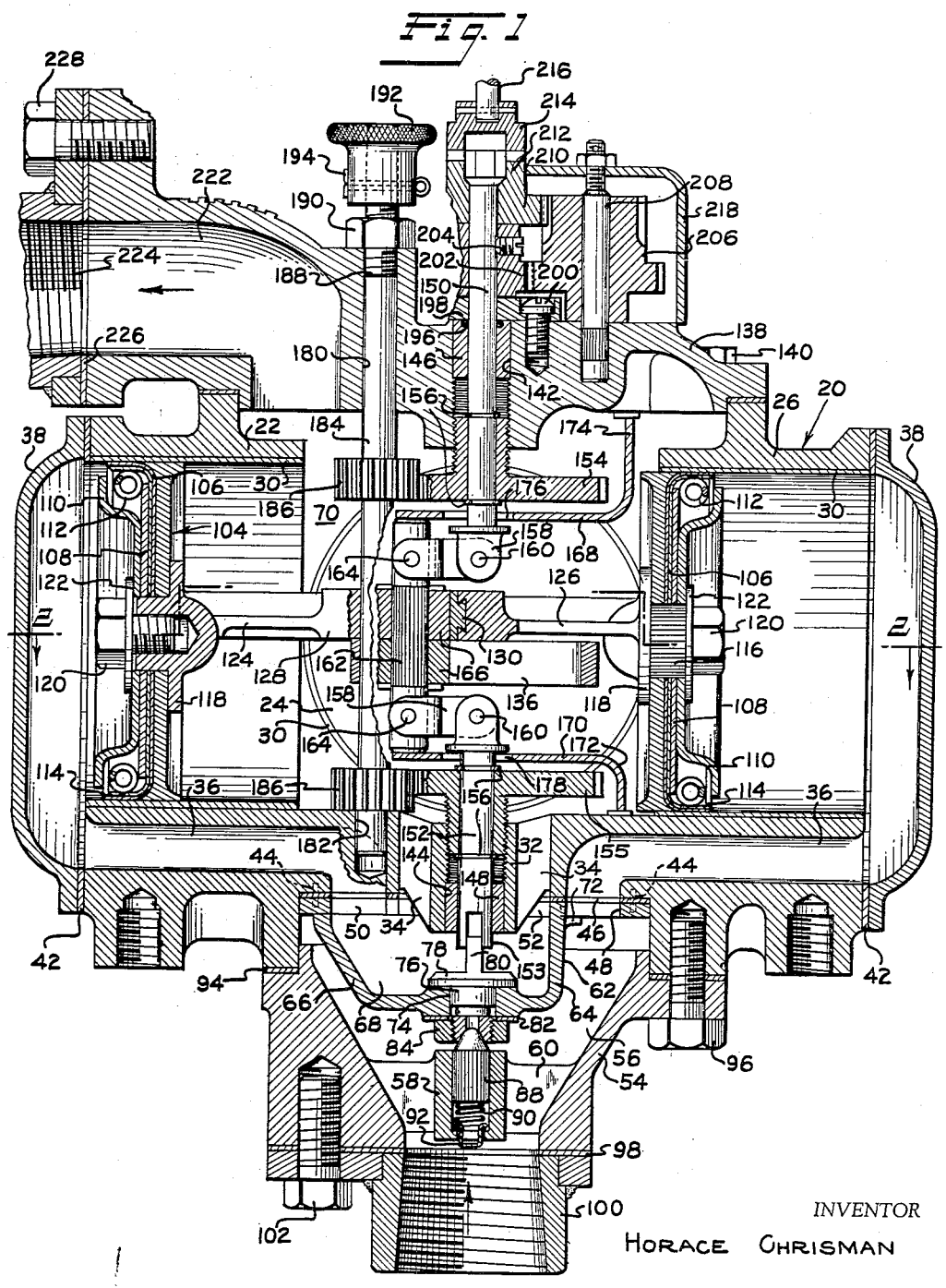

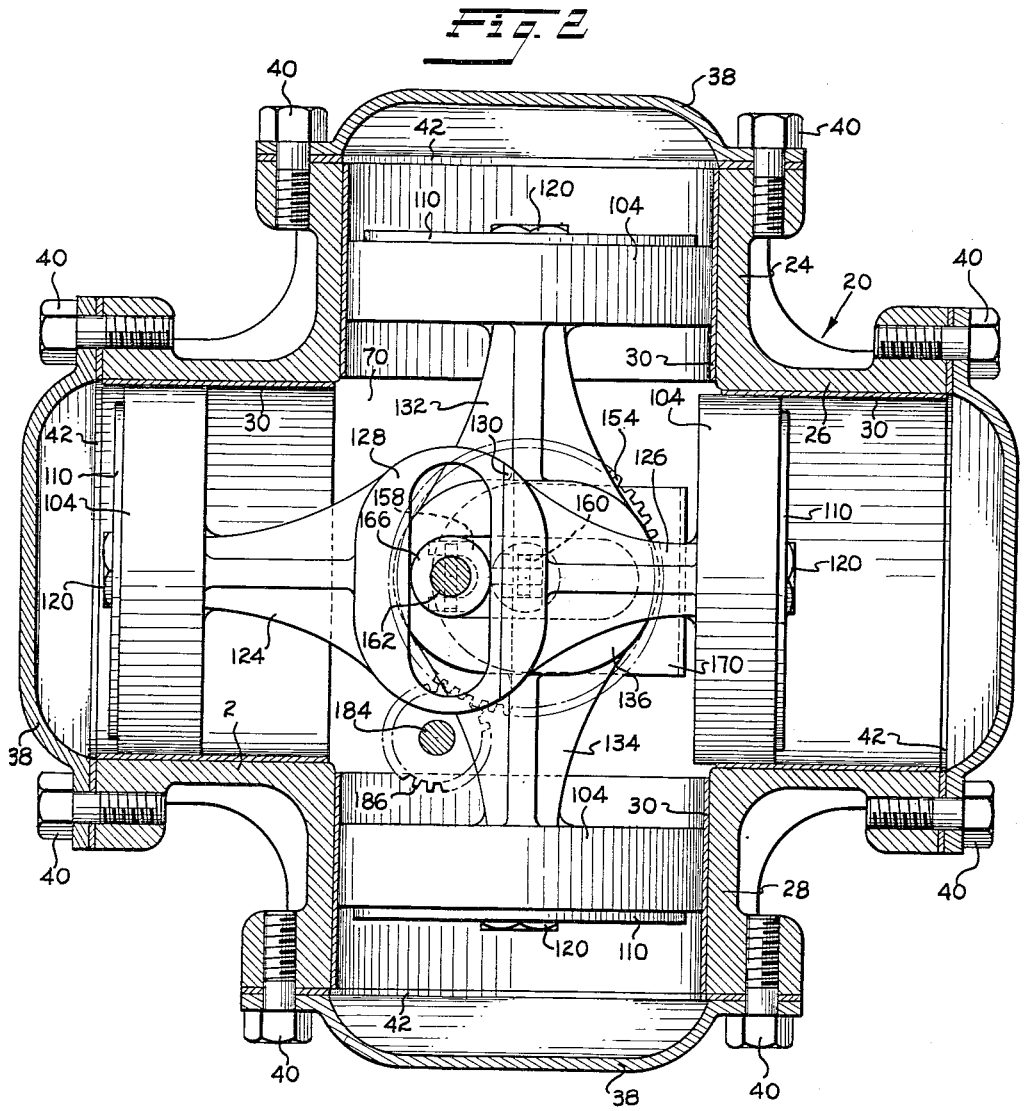

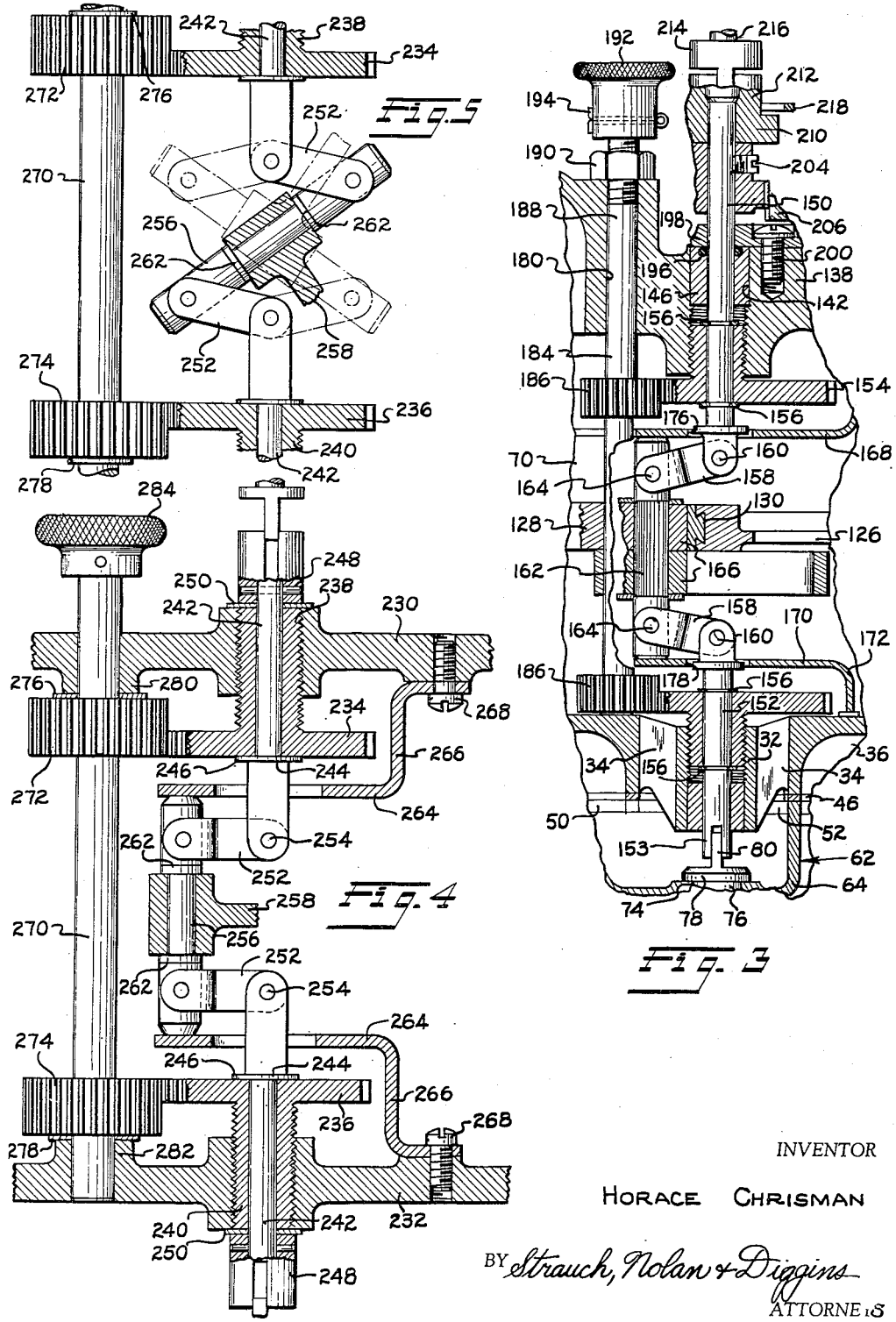

2,760,384

ADJUSTABLE MECHANICAL MOVEMENTS

Horace Chrisman, Pittsburgh, Pa., assignor to Rockwell Manufacturing Company, Pittsburgh, Pa., a corporation of Pennsylvania Application November 19, 1952, Serial No. 321,296

5 Claims. (Cl. 74—600)

This invention relates to mechanical movements and more particularly to adjustable mechanical movements for translating linear motion into rotary motion, or the converse thereof, particularly useful in piston meters.

This invention will therefore be particularly disclosed in its preferred embodiment in piston type fluid displacement meters wherein it is desired to vary the linear movement of the piston to vary the volume of fluid discharged by the meter. However, it is to be understood that the adjustable mechanisms of the invention are not limited to use in piston meters but finds wide application wherever it is desired to translate rotary motion to linear motion or the converse thereof.

Mechanical movements heretofore known in the art for translating rotary motion to linear motion or the converse thereof have for the most part either been non-adjustable or have been only partially adjustable. In the former case, the lack of adjustability puts definite limitations on the use of the movement and practically precludes its use in devices necessitating a calibration adjustment such as piston meters where different mediums or conditions require accurate adjustment of the device. In the second group or partially adjustable movements, the wear by eccentric bearing loads are increased with a consequent decrease in service due to unbalanced adjustment. Further by use of partially adjustable movements the degree or amount of adjustment is limited to keep the mechanical movement structure to a reasonable size.

I have invented a fully adjustable mechanical movement comprising an articulated crankshaft in which the arms of the crankshaft are freely adjustably mounted for varying the throw of the crank. Additionally I provide novel means for maintaining the crank pin in the same plane of rotation throughout the limits of adjustment. As a result, the novel mechanical movement herein disclosed provides a full range of accurate adjustments without imposing undue or unbalanced loads on the elements of the mechanism, making the movement ideally suited for a wide variety of uses where it is desired to convert rotary motion to linear motion or the converse thereof.

It is therefore a major object of this invention to provide a relatively simple and rugged mechanical movement for converting rotary motion to linear motion and the converse thereof;

It is yet another object of this invention to provide an adjustable crank-type mechanical movement for converting rotary motion into linear motion and the converse thereof with means to maintain the crank in the same plane of rotation throughout the range of adjustment;

It is a further object of this invention to provide an adjustable mechanical movement for converting rotary motion to linear motion and the converse thereof with novel means for assuring even adjustment of the movement; either while stationary or while in operation;

It is still a further object of this invention to provide a piston meter having a novel adjustable mechanical movement interposed between the pistons and the output shaft for accurate calibration over a wide range.

It is an additional object of this invention to provide an adjustable mechanical movement for converting rotary motion to linear motion and the converse thereof comprising an articulated crankshaft having adjustably mounted arms for varying the throw of the crank and means for equally adjustably moving the arms.

These and other objects and advantages will appear from the following description and appended claims when used in conjunction with the attached drawings wherein:

Figure 1 is a vertical section of a fluid meter of the piston displacement type showing means for operatively connecting the pistons with the fluid inlet and outlet control valve and showing the novel adjustable mechanical movement as applied to the fluid meter for translating linear movement of the pistons to rotary movement for a register drive, adjusted to maximum piston movement;

Figure 2 is a top plan view taken along the line 2—2 of Figure 1 showing the disposition of the novel mechanical movement relative to the piston connecting rods;

Figure 3 is a partial sectional view of the mechanical movement shown in Figure 1 adjusted to minimum piston movement;

Figure 4 is a vertical sectional view of a slight modification of the novel mechanical movement shown in Figure 1 for general use other than in a fluid meter.

Figure 5 is a vertical section of a further modification of the novel mechanical movement showing a skewed crank pin connecting the crank-shaft arms whereby rotary motion is converted to oscillatory motion.

Referring in further detail to the drawings, for the purpose of the present explanation, I have shown the meter body 20 in the form of a die cast aluminum cylinder block having four horizontally disposed cylinders 22, 24, 26, and 28 spaced 90° apart. A brass liner sleeve 30 is pressed into each cylinder, and then rolled and burnished to the required diameter. Between the cylinders at the lower sides thereof and coaxial with the vertical centerline of the meter body a bearing sleeve 32 is integrally connected with the cylinder wall by spaced webs 34. The wall of each cylinder at the lower side thereof is relatively thick and provided with a longitudinally extending passage 36 opening downwardly at its inner end through the cylinder wall and is in communication at its outer end with the associated cylinder. The outer end of each cylinder is closed by a head 38 secured thereto by cap screws 40, with sealing gasket 42 disposed between the cylinder and head.

In the cylinder block between the ends of passages 36 dowel pins indicated at 44 are inserted to accurately locate a gasket 46 coated with a suitable adhesive and a valve seat plate 48. The plate 48 is provided with four circumferentially extending slots or openings 50 which register with the inner ends of the passages 36 in the walls of the respective cylinders, the plate also has a central circular opening 52 which registers with the annular space between the bearing sleeve 32 and the cylinder walls. Gasket 46 is also provided with similar slots and a central opening.

A bottom cover member 54 has an upwardly flaring fluid inlet passage 56 and at the lower end thereof a coaxially disposed upwardly opening bearing socket 58 is connected with the wall of passage 56 by a plurality of radial webs 60.

The valve assembly comprises a rotary valve member 62 which is centrally formed with a hollow cylindrical portion 64 having a quadrant shaped lateral extension 66 to register with the slots 50 in the valve seat plate 48 and providing a fluid outlet receiving chamber 68 in constant communication through the central opening 52 in the valve seat plate and with the interior of the meter body or cylinder block which forms a common fluid outlet receiving chamber 70 for the four piston cylinders. At the upper open side of the chamber 68, valve member 62 is provided at diametrically opposite sides thereof with flanges 72 extending circumferentially from the ends of the quadrant shaped portion 66 of chamber 68 and terminating in spaced relation from each other to provide a space or recess which is substantially equal to the length of the slots 50 in the valve seat plate 48.

The lower end wall of the cylindrical portion 64 of the valve member is provided with an axially centered cylindrical opening 74 in which a coupling member 76 is inserted said member at its upper end having a head or flange 78 provided with a male coupling part 80. The lower end of member 76 is threaded and receives the lock washer 82 and jam nut 84 whereby the member is securely held against rotation or axial displacement relative to the valve member 62.

The lower end face of member 76 has a conical seat for receiving the conical end of bearing member 88 slidably disposed in the open socket 58 against the upper end of spring 90 which is secured at its lower end to the base wall of socket 58 by a suitable wire clip 92. Thus the valve member is yieldingly urged upwardly into close seating contact with the lower face of plate 48.

The cover member 54 is rigidly secured to the cylinder block upon the interposed gasket 94 by suitable cap screws 96. A gasket 98 is mounted on the lower end of cover 54 and is compressed between the cover and pipe coupling member 100 attached to the cover by suitable cap screws 102.

Each of the cylinders 22, 24, 26, and 28 contains a reciprocating piston which comprises piston head 104, a cup leather 106, spacing plate 108, piston skirt 110, an annular coil spring 112 between the skirt 110 cup leather 106, and an annular retaining plate 114 disposed outwardly of the spring between the free edge of cup leather 106 and piston skirt 110. Piston head 104, cup leather 106, spacing plate 108, and skirt 110 are provided with axially aligned central openings for receiving internally threaded boss 116 therein having a shoulder 118 abutting the innermost face of piston 104. Locking screw 120 is threadedly secured in boss 116 and engages washer 122 interposed therebetween to clampingly hold the units of the piston seal in assembled relation.

As seen in Figure 1 of the drawing diametrically opposed pistons 104 in cylinders 22 and 26 are rigidly connected for unitary movement by a top scotch yoke mechanism comprising a pair of rods 124 and 126 connected at their outermost ends to the left and right hand boss 116 as shown in Figure 1. At its innermost end the rod 124 is provided with a slotted cross head 128 and a dovetail tongue 130 operatively engaging a similarly shaped dovetail groove in the adjacent end of rod 126. An identical bottom scotch yoke assembly comprising rod 132 similar to rod 124 and rod 134 similar to rod 126 are connected to the pistons of cylinders 24 and 28 respectively with the slot of cross head 136 disposed at right angles to the slot of cross head 128.

Top cover member 138, is secured to the meter body 20 as by cap screws 140 and is provided with bore 142 in axial adjustment with bore 144 in sleeve 32.

I have provided a novel adjustable mechanical movement which in the application shown in Figure 1 translates linear movement of the pistons to rotary movement of an output shaft for driving a recording register, a detailed description of which now follows.

Bores 142 and 144 are each partially threaded from their innermost ends outwardly with a right and left hand thread respectively, and also respectively receive annular bearing rings 146 and 148, preferably of bearing bronze, which are press fitted into the outer ends of the bores. Shafts 150 and 152 of a crankshaft assembly are rotatably mounted in bores of adjustment gears 154 and 155 which are respectively provided with right and left hand threaded shanks for threaded engagement with bores 142 and 144 respectively as best shown in Figure 1. A pair of snap rings 156, preferably of bearing material, are received in appropriate grooves of shafts 150 and 152 in bearing contact with opposite sides of gears 154 and 155 respectively.

The lowermost end of shaft 152, as viewed in Figure 1, is provided with a bifurcated portion 153 slidably receiving, therebetween, male coupling part 80 with sufficient clearance between the end of shaft 152 and flange 78 to permit the shaft to axially slide on said coupling part 80. Thus it will be seen that the inward or outward threading of gears 154 and 155 will also cause the respective gear shafts 150 and 152 to move in and out of the cylinder housing for a purpose which will appear. Identical links 158 each have a tongue end pivotally mounted within a bifurcated inner end of shafts 150 and 152, respectively, on pivot pin 160, the other end of each link is bifurcated and pivotally connected to opposite flattened ends of crank 162 by pivot pins 164. Crank pin 162 is vertically disposed in the slots of cross heads 128 and 136 and loosely mounts a pair of identical rollers 166 which are in rolling contact with the sides of the slot of a respective cross head.

A pair of circular plates 168 and 170, preferably of bearing material, are disposed in bearing contact with opposite ends of crank 162 and have legs 172 and 174 respectively connected to an inner wall and top cover member 138 by suitable means (not shown), respectively, as best shown in Figure 1.

Plates 168 and 170 are provided with axially aligned central openings 176 and 178 to permit the inner ends of shafts 150 and 152, respectively, to extend therethrough. Thus as shafts 150 and 152 are rotated the opposite ends of crank pin 162 will rotate in bearing contact against plates 168 and 170, respectively which serve to maintain crank pin 162 in the same plane throughout its rotation.

Top cover member 138 and the lower cylinder wall of cylinder 22 are provided with axially aligned bores 180 and 182, respectively, for rotatably mounting adjustment shaft 184 therein, at one side of connecting rod 124 in non-interfering relation with the action of the crossheads. A pair of gears 186 are rigidly mounted on shaft 184 by suitable means (not shown) and are in constant mesh with gears 154 and 155, as best shown in Figure 1. The gears 186 are sufficiently wider than gears 154 and 155 to allow for relative longitudinal movement therebetween, for a reason which will appear. Shaft 184 extends exteriorly of cover member 138 and is threaded as at 188 to threadedly receive jam nut 190 and knurled actuating handle 192 which is secured thereto by cotter pin 194.

Thus it will be seen that clockwise rotation of actuator 192 will impart rotation to gears 154 and 155 and cause them to be threadedly moved into their respective bores away from crossheads 128 and 136. This movement will also cause shafts 150 and 152 to move away from the crossheads by virtue of snap rings 156 disposed on either side of gears 154 and 155 operatively engaging the shafts, and as a result, links 158 will also be moved outwardly away from the crossheads to thereby reduce the distance between centerlines of crankpin 162 and aligned shafts 150 and 152. This reduction in centerline distance reduces the throw of the crank and consequently reduces the linear movement of the pistons, as is best shown in Figure 3. Rotation of actuator 192 in a counterclockwise direction will of course move shafts 150 and 152 inwardly to adjustably increase the centerline distance and throw of the crank, to a maximum throw as illustrated in Figure 1.

Shaft 150 extends exteriorly of top cover member 138 for driving a register through a reduction gear train to be presently described. The outer end of bearing 146 is provided with annular recess encircling shaft 150 for receiving O-seal 196. Seal retainer 198, preferably of bearing bronze, is mounted on shaft 150 with a close running fit, in contact with seal 196 and is secured to cover member 138 as by cap screws 200. Gear 202 is rigidly secured to shaft 150 by set screw 204 and is rotatable therewith to drive double gear 206 rotatably mounted on shaft 208 which is splined in cover member 138. Double gear 206 in turn meshes with coupler-gear 210 rotatably mounted on shaft 150 having a couple 212 on its outer end for coupling engagement with couple 214 on a register shaft 216. The reduction gear assembly is enclosed in a housing 218 which is secured in fixed relation to the cover member by nut 220 threaded upon the upper end of splined shaft 208.

Cover member 138 is further provided with integrally formed outlet duct 222 which is in communication with chamber 70. Internally threaded fitting 224 for attachment to a fluid line is secured to outlet 222 on interposed gasket 226 as by cap screws 228.

In operation of the meter, valve member 62 is in the position shown in Figure 1 of the drawings, fluid under pressure flows through inlet chamber 56, between the spaced flanges 72 of the valve member and uncovered opening 50 in valve seat plate 48 and thence through passage 36 into the outer end of the right hand cylinder 26. Since the pistons in the opposed cylinders 22 and 26 are rigidly connected as a unit, as the liquid pressure in the right hand cylinder 36 forces the piston therein to the left, the piston in the left hand cylinder 22 moves correspondingly therewith, and thus forces liquid from the latter cylinder through passage 36 thereof and opening 50 in valve seat plate 48 which is in registration with chamber 68 with valve member 62. The fluid then passes upwardly through opening 52 and around sleeve 32 into chamber 70 of the cylinder block from which it flows through the outlet 222 on cover member 138. As the pistons are operatively connected with valve 62, said valve is rotated in properly timed relation with the reciprocation of the pistons to alternately connect the passages 36 of the opposed cylinders with the inlet and outlet sides of the valve in proper sequence.

Movement of actuator 192, as previously noted, varies the linear travel of the piston and consequently varies the volume of fluid discharged by the meter per cycle and is therefore a simple and accurate calibration adjustment for the meter.

The novel arrangement of the relatively sliding elements and the constantly engaged adjusting means that form the novel mechanical movement of this invention permit adjustment to vary the linear travel of the pistons even while the meter is in operation, thus obviating unnecessary and repeated shutdowns to attain an accurate calibration of the meter. This adaptability of adjustment while in operation is inherent in the novel mechanical movement, regardless of the installation in which it is used, as will be clearly seen by referring to the drawings.

Referring now to Figure 4 there is shown a further embodiment of my mechanical movement for general use where it is desired to convert linear movement to rotary movement or the converse thereof. A pair of supports 230 and 232 are held in spaced relation by suitable means (not shown) and are provided with right and left hand threaded bores respectively for threadedly receiving gears 234 and 236 respectively provided with right and left hand threaded shanks 238 and 240. Similar shafts 242 are rotatably mounted in axially aligned bores in the respective gears and each have an integral shoulder 244 in bearing contact with bronze washer 246 disposed between each shoulder and an inner face of the respective gear. A coupling 248 or other suitable means is secured to the outer end of each shaft in bearing contact with bronze washer 250 disposed between the outer end of each gear and respective coupling. Thus each gear is held between a respective shoulder and coupling so that there is no relative axial movement between the gear and its respective shaft. The inner end of each shaft is provided with a bifurcated portion for respectively pivotally mounting similar links 252 on pins 254. The opposite ends of links 252 are bifurcated and are similarly respectively pivotally connected to opposite ends of crank pin 256. Connecting rod 258 is provided with a head portion 260 rotatably mounted on crank pin 256 between spaced integral shoulders 262 of the crank pin. Head portion 260 is split to facilitate mounting the connecting rod between shoulders 262 and is held assembled by suitable means (not shown).

Similar circular bracket members 264, preferably of bearing bronze are assembled in bearing contact with opposite ends of crank pin 256 and are each provided with a central bore for respective shafts 242 to extend through. Leg portion 266 of each bracket is suitably secured to a respective support as by screws 268. It will thus be seen that crank pin 256 is held to revolve in a path bounded by the parallel spaced brackets thus eliminating any undue wobbling of crank pin 256 and connecting rod 258.

Adjustment shaft 270 is journaled in the spaced supports in axially spaced relation to the common axis of shafts 242, and is provided with a pair of spaced gears 272 and 274 each relatively wider than and in mesh with gears 234 and 236 respectively. Gears 272 and 274 are rigidly secured to shaft 270 to rotate therewith and are in bearing contact with respective bronze washers 276 and 278 disposed between each gear and respective integral shoulders 280 and 282 of supports 230 and 232.

An actuating knob or handle 284 is rigidly secured to one end of shaft 270 for actuating shaft 270 to adjust the mechanical movement, as will presently be described.

Rotation of knob 284 in a counterclockwise direction will cause gears 234 and 236 to be threadedly moved outwardly away from connecting rod 258. Since the gears and their respective shafts are assembled for no relative axial movement the respective shafts will also be moved outwardly away from connecting rod 258 which will cause crank pin 256 to be moved closer to the axis of shafts 242 thus lessening the throw or stroke of the crank and consequently connecting rod 258. The novel mechanical movement can be adjusted to any desired position between the maximum and minimum limits, as shown in Figures 1 and 3. The relatively wider gears 272 and 274 are provided to assure constant mesh of respective gears 234 and 236 throughout their travel between the maximum and minimum limits of adjustment.

Turning now to Figure 5 there is shown a further embodiment of my novel mechanical movement wherein rotary motion can be converted to oscillatory movement or the converse thereof. In the embodiment shown in Figure 5 the elements of the device are the same as illustrated in Figure 4, however connecting links 252 extend in opposite directions, as shown in full lines, to hold crank pin 256 at an angle. Links 252 can also be arranged as shown in dotted lines to tilt crank pin 256 in the opposite direction. Rotary movement of shafts 242 will then be converted into oscillatory movement of the connecting rod 258. The degree of oscillation can be controlled by turning knob 284 as described in connection with Figure 4.

From the foregoing it will be seen that I have invented a novel adjustable mechanical movement for converting rotary movement to reciprocatory or oscillating movement or the converse thereof.

I have disclosed a typical embodiment of my novel adjustable mechanical movement in combination with a fluid meter wherein the mechanical movement provides a minimum number of working parts of a simple and rugged structural form and which can be embodied in the meter at low manufacturing costs. As a result the meter is of reduced weight, is capable of very accurate calibration, and will have prolonged efficient and reliable operation. However, my novel adjustable mechanical movement has a myriad of applications wherever it is desired to adjustably convert rotary motion to reciprocatory or oscillatory motion or the converse thereof in a simple, efficient, and relatively inexpensive manner.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. A variable throw crank assembly comprising a first support having an internal bore; a first adjustment member mounted in said bore; a first shaft rotatably supported in said adjustment member; means fixing said first shaft against axial movement with respect to said first adjustment member; a second support in spaced relation with said first support and having an internal bore axially aligned with the bore in said first support; a second adjustment member mounted in the bore of said second support, a second shaft rotatably mounted in said second adjustment member in alignment with said first shaft; a crank pin; crank arms pivotally connecting the opposite ends of said crank pin, respectively, to one end of each of said shafts, and means for simultaneously moving said adjustment members carrying said shafts axially with respect to said supports in equal opposite increments to vary the throw of said crank pin while maintaining the axes of said pin and said shafts in parallel relation.

2. The assembly of claim 1 together with means rigid with said supports for maintaining said crank pin in longitudinally fixed position in all rotative positions of said crank assembly.

3. A variable throw crank assembly comprising a first support having a threaded internal bore; a first adjustment member having a threaded portion mounted in said bore; a first shaft rotatably supported in said adjustment member; means fixing said first shaft against axial movement with respect to said first adjustment member; a second support in spaced relation to said first support and having an internal threaded bore axially aligned with the bore in said first support; a second adjustment member having a threaded portion mounted in the bore of said second support; a second shaft rotatably mounted in said second adjustment member in alignment with said first shaft; means fixing said second shaft against axial movement with respect to said second adjustment gear; a crank pin; crank arms pivotally connecting the opposite ends of said pin, respectively, to one end of each of said shafts; and means for rotating said gears simultaneously in equal amounts to move said gears carrying said shafts in equal and opposite increments to vary the throw of said crank pin while maintaining the axes of said pin and said shafts in parallel relation.

4. The assembly as set forth in claim 3 together with pilot means rigid with said supports and providing an annular surface operatively engaging opposite ends of said pin in all rotative positions thereof to thereby maintain said pin in axially fixed position.

5. A variable throw crank assembly comprising a first support having a threaded internal bore; a first adjustment member having a threaded portion mounted in said bore; a first shaft rotatably supported in said adjustment member; means fixing said first shaft against axial movement with respect to said first adjustment member; a second support in spaced relation to said first support and having an internal threaded bore axially aligned with the bore in said first support; a second adjustment member having a threaded portion mounted in the bore of said second support; a second shaft rotatably mounted in said second adjustment member in alignment with said first shaft; a crank pin; crank arms pivotally connecting the opposite ends of said pin respectively, to one end of each of said shafts; a control shaft rotatably mounted in parallel spaced relation with said pair of shafts; control gears mounted on said shaft for rotation therewith opposite said adjustment gears and in engagement therewith whereby upon rotation of said control shaft said adjustment gears will be rotated in the same direction simultaneously to thereby move said shafts axially relative to said supports in equal and opposite increments to vary the throw of said crank while maintaining the axes of said pin and said shafts in parallel relation; and means mounted in fixed relation with said supports providing an annular surface engaging the opposite ends of said pin to thereby maintain said pin in axially fixed position in all rotative positions of said crank assembly.

References Cited in the file of this patent

UNITED STATES PATENTS

| | | |
|---|---|---|
| 1,149,728 | Ciarlo | Aug. 10, 1915 |
| 1,814,030 | Fussel | July 14, 1931 |
| 2,569,900 | Nevin et al. | Oct. 2, 1951 |

FOREIGN PATENTS

| | | |
|---|---|---|
| 28,999 | Australia | Sept. 15, 1930 |
| 864,214 | France | Jan. 13, 1941 |